(12) United States Patent
Canudas de Wit et al.

(10) Patent No.: US 6,239,574 B1
(45) Date of Patent: May 29, 2001

(54) MINIMUM ENERGY REGULATION SYSTEM FOR AN ASYNCHRONOUS MOTOR BY FIELD ORIENTED CONTROL

(75) Inventors: Carlos Canudas de Wit, Saint-Martin d'Oriage (FR); Jose Miguel Ramirez, Cali (CO); Didier Georges, Romans (FR)

(73) Assignee: Schneider Electric Industries SA, Boulogne Billancourt (FR)

( * ) Notice: Subject to any disclaimer, the term of this patent is extended or adjusted under 35 U.S.C. 154(b) by 0 days.

(21) Appl. No.: 09/442,753

(22) Filed: Nov. 18, 1999

(51) Int. Cl.$^7$ ........................................... H02P 5/28
(52) U.S. Cl. ..................... 318/798; 318/811; 318/802; 318/432; 318/434; 318/727
(58) Field of Search ........................ 318/811, 802, 318/432, 798, 727, 434

(56) References Cited

U.S. PATENT DOCUMENTS 5,444,351    8/1995    Yamamura et al. .

6,008,618  * 12/1999  Bose et al. ..................... 318/811

FOREIGN PATENT DOCUMENTS 196 15 095
        C1    8/1997   (DE) .

OTHER PUBLICATIONS

Patent Abstracts of Japan, vol. 96, No. 10, Oct. 31, 1996 and JP 8–149897 A, Jun. 7, 1996.

C. Canudas De Wit, et al. "Robust Torque Control Design for Induction Motors: the Minimum Energy Approach," Automatica, vol. 33, No. 1, 1997, pp. 63–79.

* cited by examiner

Primary Examiner—Karen Masih
(74) Attorney, Agent, or Firm—Oblon, Spivak, McClelland, Maier & Neustadt, P.C.

(57) ABSTRACT

The invention relates to a regulation system for an asynchroNOus motor by field oriented control, reacting to a torque set value (T) and a flux set value (φ). The flux set value is supplied from the torque set value by an operator carrying out first order low pass filtering (40) and calculating the square root (42) of the result of the filtering.

6 Claims, 2 Drawing Sheets

MINIMUM ENERGY REGULATION SYSTEM FOR AN ASYNCHRONOUS MOTOR BY FIELD ORIENTED CONTROL

This invention relates to a regulation system for an asynchroNOus motor, and more specifically a regulation system by Field Oriented Control (FOC).

Figure 1:
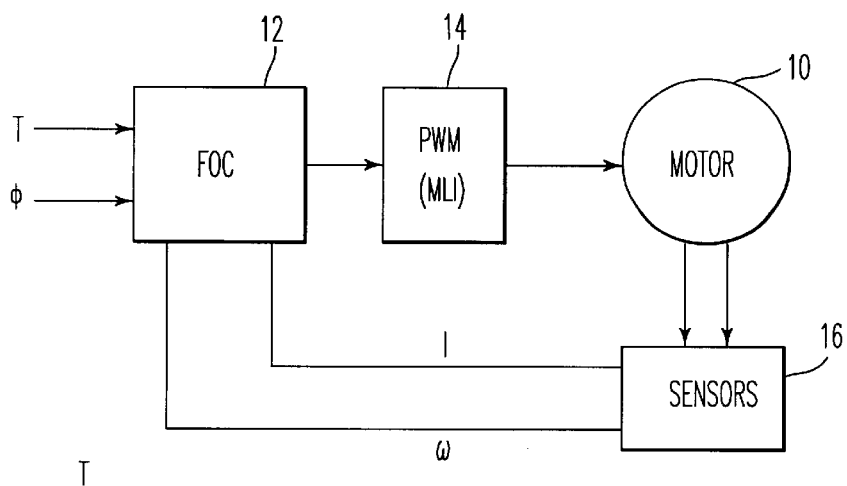

FIG. 1 diagrammatically shows a conventional field oriented control system for an asynchroNOus motor 10. A field oriented control device 12 controls the motor 10 through a pulse width modulator 14. The control device 12 uses the current I and the motor rotation speed ω that are supplied to it by sensors 16. The control device 12 receives two set values, namely the required torque T and the required flux φ.

In simple regulation systems, or constant flux systems, the flux φ is chosen to be equal to its NOminal value, and the torque set value T is adjusted to obtain the required operation. For example, to servocontrol the rotation loop of the motor 10 to a speed set value, a regulation loop determines the torque set value T as a function of the difference between the set speed and the recorded speed ω.

In practice, when the rotation speed ω exceeds the motor NOminal rotation speed $ω_n$, a flux set value equal to the NOminal flux is inadequate since it provokes saturation of the pulse width modulator 14 leading to a NOn-linear reaction of the motor to the control device 12.

Figure 2:
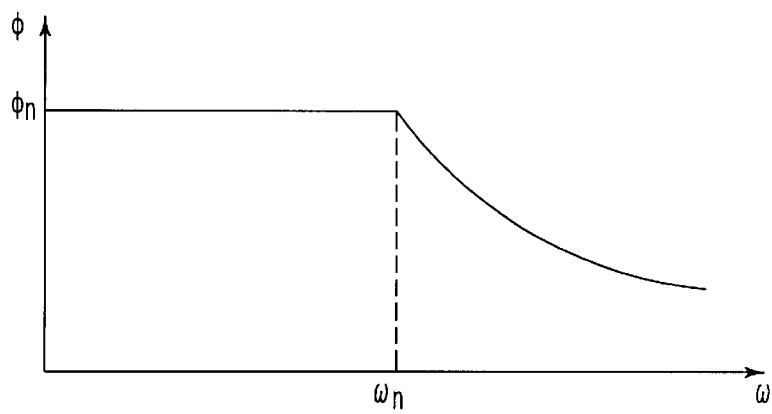

FIG. 2 shows a variation of the maximum flux set value necessary to avoid saturation pheNOmena, as a function of the rotation speed ω, at an arbitrary scale. Until the NOminal rotation speed $ω_n$, the flux set value is equal to the NOminal flux $φ_n$. Starting from the speed $ω_n$, the flux set value follows a decreasing curve that corresponds to the input saturation limit of the pulse width modulator.

In a conventional regulation system with field oriented control, a flux attenuation circuit is frequently used on the flux set value input on the control device 12, that reproduces the curve in FIG. 2 starting from the rotation speed ω supplied by sensors 16.

A constant flux regulation system of the type shown in FIG. 1, possibly used with a flux attenuation circuit according to FIG. 2, provides optimum efficiency of the motor 10 under NOminal operating conditions. For many applications (pumps, electric vehicles, etc.), motors are frequently used under conditions very different from NOminal conditions, and particularly when underloaded. Therefore, the motor efficiency becomes particularly bad.

Figure 3:
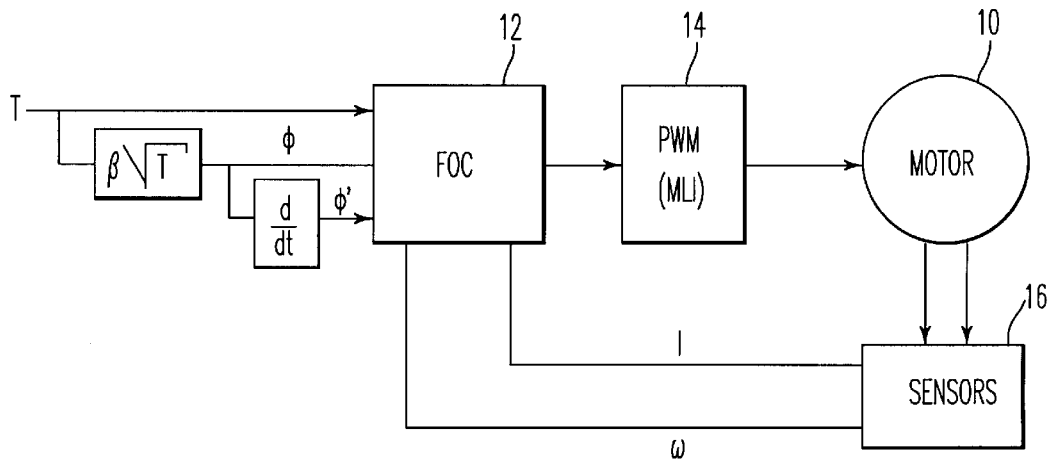

FIG. 3 shows one solution for optimizing the efficiency at any motor speed, as described in the article entitled "Robust Torque Control Design for Induction Motors: the Minimal Energy Approach", by C. Canudas de Wit and I. Seleme, published in Automatica, volume 33, No. 1, pages 63–79, 1997. This solution is based on the field oriented control regulation system in FIG. 1. The control device 12, instead of receiving a constant flux set value, receives a flux set value φ that is a function of the torque set value T. More specifically, the flux set value φ is equal to B√T, where $β=φ_n/√T_n$, $φ_n$ is the NOminal flux and $T_n$ is the NOminal torque of the motor. Obviously, the attenuation function in FIG. 2 is applied to the flux set value φ if necessary. Furthermore, in this case the field oriented control device 12 is designed to receive the derivative φ' of the flux set value φ with respect to time.

This type of system is particularly simple, and provides excellent results regardless of the condition of the motor 10, provided that it is in a practically steady state condition. If the torque set value T varies too quickly, the system performances are degraded and become even worse than for a system with constant flux.

The literature describes solutions using digital calculations or based on heuristics that are designed to determine optimum control parameters at all times. These solutions are too expensive to be applied in practice due to the complexity of the calculations that have to be carried out in real time.

One objective of this invention is to provide a particularly simple regulation system for an asynchroNOus motor that enables operation under optimum conditions regardless of the speed of the motor and the rate of change of the set value.

In order to achieve this objective, this invention includes a regulation system for an asynchroNOus motor by field oriented control, reacting to a torque set value and a flux set value. The flux set value is supplied from the torque set value by an operator carrying out first order low pass filtering and calculating the square root of the result of the filtering.

According to one embodiment of this invention, the operator also applies a limitation to excursions of the torque set value between a minimum threshold and a maximum threshold, before filtering.

According to one embodiment of this invention, the operator also limits the result of the square root to a maximum value that is constant up to a NOminal value of the motor rotation speed, and then decreases as a function of the rotation speed, and then carries out a second first order low pass filtering.

According to one embodiment of this invention, the low pass filter transfer function is expressed as follows:

$$\frac{b}{a+s} \quad \text{where} \quad a = \frac{2 R_r T_n}{n φ_n^2} \quad \text{and} \quad b = \frac{2 R_r}{n}$$

where s is the Laplace operator, $R_r$ is the resistance of the motor rotor, $T_n$ is the motor NOminal torque, n is the number of poles in the motor, and $φ_n$ is the NOminal flux of the motor.

According to one embodiment of this invention, the system also reacts to the derivative of the flux set value with respect to time.

According to one embodiment of this invention, the said maximum threshold is the NOminal motor torque and the said minimum threshold is of the order of 4% of the NOminal torque.

Figure 4:
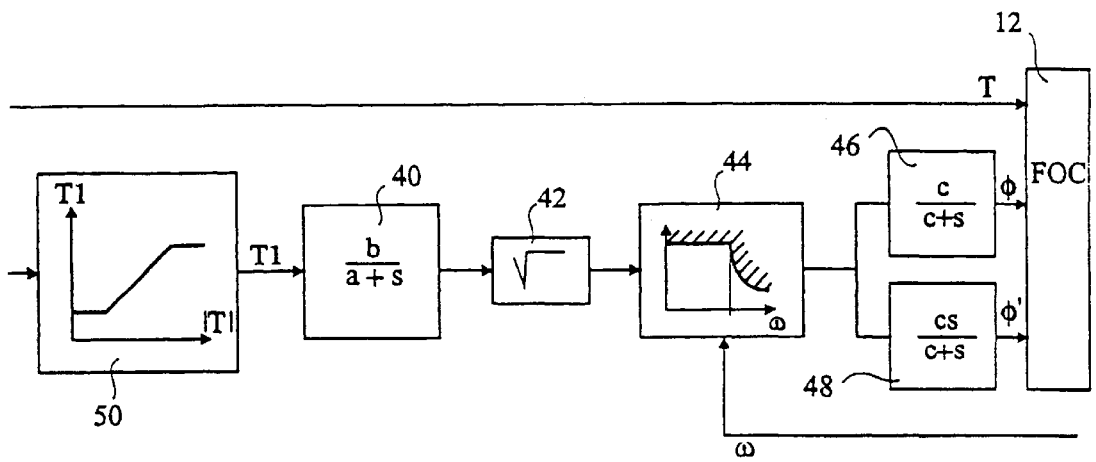
Figure 5:
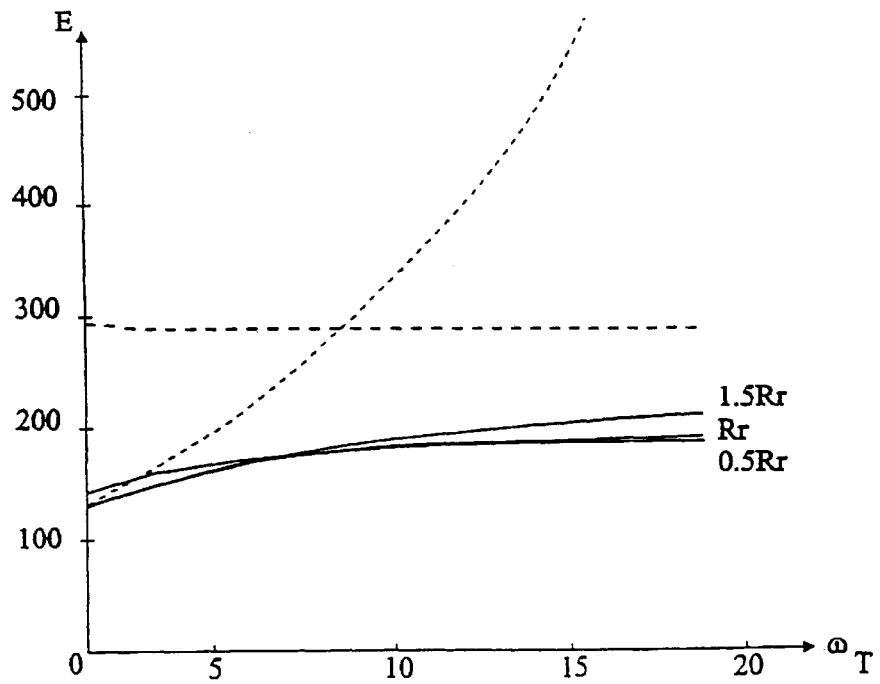

These and other objectives, characteristics and advantages of this invention will be described in detail in the following description of particular embodiments provided NOn-restrictively with relation to the attached figures in which:

FIG. 1, described above, diagrammatically shows a regulation system using field oriented control for an asynchroNOus motor;

FIG. 2, described above, illustrates a conventional flux attenuation function to be applied to a flux set value to obtain linear operation at all times;

FIG. 3 illustrates a conventional solution using the system in FIG. 1 to obtain maximum efficiency at any steady state condition of the motor;

FIG. 4 diagrammatically shows processing elements according to the invention designed to control a particular flux set value starting from a torque set value; and FIG. 5 shows a diagram illustrating the performances of the systems in FIGS. 1, 3 and 4, as a function of the rate of change of the set value.

In FIG. 4, a processing system according to the invention provides a flux set value φ to a field oriented control device 12 built into a system of the type shown in FIG. 1, starting from a torque set value T.

This processing system was produced following a detailed study carried out by the inventors.

The essential function of this processing system is to make a first order low pass filter on the torque set value, and to use the square root of the result of filter as the flux set value. In FIG. 4, these operations are materialized by a filter 40 followed by a circuit calculating the square root 42. Other elements in the processing system, NOt yet described, may be omitted under some operating conditions of the system.

The transfer function of the filter 40 is expressed as b/(a+s), where a and b are constants and s is the Laplace operator. The optimum values for the constants of this filter are:

$$a = \frac{2\,R_r T_n}{n\phi_n^2} \quad \text{and} \quad b = \frac{2\,R_r}{n}$$

where $R_r$ is the resistance of the motor rotor, $T_n$ is the motor NOminal torque, n is the number of poles in the motor, and $\phi_n$ is the NOminal flux of the motor.

FIG. 5 illustrates the performance gain obtained with the system according to the invention. It shows energy consumption curves as a function of the rate of change of the torque set value T. Tests have been carried out with a sinusoidal torque set value varying between −10% and +10% of the NOminal motor torque and the frequency $\omega_T$ of which is shown in radians per second. A 7.5 kW motor was used to drive a load with inertia 0.22 kg.m². The energy consumed E is expressed in Joules on 4 s.

A curve in dashed lines shows the energy consumed by using a conventional constant flux system of the type shown in FIG. 1. The curve in dashed lines shows the energy consumed using an optimized conventional system of the type shown in FIG. 3. A family of curves shown in solid lines represents the energy consumed using a regulation system according to the invention.

It can be seen that the constant flux system produces a significantly constant energy consumption (shown in dashed lines) with a relatively high value. The optimized conventional system in FIG. 3 produces an optimum energy consumption under steady state conditions ($\omega_T=0$) (shown in dashed lines) but which increases regularly as a function of the frequency of the torque set value, and quickly exceeds the energy consumption of the constant flux system.

The energy consumption (shown in solid lines) produced using a regulation system according to the invention increases slowly starting from the optimum value of the steady state condition and becomes flatter at high frequencies of the torque set value, to remain significantly less than the energy consumed with the two conventional regulation systems.

The optimum values of the constants a and b supplied above depend on the resistance $R_r$ of the motor rotor. However this resistance varies particularly as a function of the motor temperature. Variations of ±50% are frequently observed around the NOminal value. The family of curves in solid lines shown in FIG. 5 illustrates the range of variation of energy consumption as a function of the variation in the rotor resistance.

It can be seen that the performance of the regulation system is degraded at high speeds if the value of the rotor resistance exceeds its NOminal value, and at low speeds if the rotor resistance is less than its NOminal value. But the global performances remain significantly better than the global performances of conventional systems.

This family of curves also shows that constants a and b can be chosen within a relatively wide range without significantly affecting the performances of the system.

If the regulation system according to the invention is to be applied to all possible applications, the processing system in FIG. 4 is preferably complemented by the elements described below.

A conventional flux attenuation circuit 44 described with relation to FIG. 2, is installed after the square root calculation circuit 42. This circuit 44 requires information about the rotation speed ω supplied by sensors 16 in the conventional regulation system shown in FIG. 1.

As indicated previously, the flux attenuation circuit 44 makes the output signal from circuit 42 decrease gradually as a function of the speed beyond the limiting saturation speed of the pulse width modulator.

The flux set value $\phi$ output to the field oriented control device 12 is input through a first order low pass filter 46 to which the output from the flux attenuation circuit 44 is input. The field oriented control device 12 may be designed, as shown in FIG. 3, to use the derivative $\phi'$ of the flux set value $\phi$. This derivative is output by a filter 48, to which the output from circuit 44 is also connected. If the filter transfer function 46 is expressed as c/(c+s), where c is a constant and s is the Laplace operator, the filter transfer function 48 is expressed as cs/(c+s).

Filters 46 and 48 are used to make sure that the flux set values $\phi$ and $\phi'$ can be differentiated at least once, which is necessary for the field oriented control device 12. The pass band for filters 46 and 48 is chosen to exceed the pass band for filter 40, and its choice does NOt affect the characteristics of the regulation system.

Furthermore, the filter 40 is preceded by an excursion limitation circuit 50 that outputs the absolute value of the torque set value T when it varies between a maximum threshold and a minimum threshold. When the absolute value of the torque set value is less than the minimum threshold, the circuit 50 outputs this minimum threshold, whereas if the absolute value of the torque set value exceeds the maximum threshold, the circuit 50 outputs this maximum torque. In practice, the maximum torque is the NOminal torque and the minimum threshold is of the order of 4% of the NOminal torque.

What is claimed is:

1. Regulation system for an asynchroNOus motor by field oriented control, reacting to a torque set value (T) and a flux set value ($\phi$), characterized in that the flux set value is supplied from the torque set value by an operator carrying out first order low pass filtering (40) and calculating the square root (42) of the result of the filtering.

2. Regulation system according to claim 1, characterized in that the operator also applies a limitation (50) to excursions of the torque set value (T) between a minimum threshold and a maximum threshold, before filtering.

3. Regulation system according to claim 1 or 2, characterized in that the operator also applies a limitation (44) to the result of the square root (44) equal to a maximum value that is constant up to a NOminal value ($\omega_n$) of the motor rotation speed, and then decreases as a function of the rotation speed, and then carries out a second first order low pass filtering (46).

4. Regulation system according to claim 1, characterized in that the low pass filter transfer function is expressed as follows:

$$\frac{b}{a+s} \quad \text{where} \quad a = \frac{2 R_r T_n}{n\phi_n^2} \quad \text{and} \quad b = \frac{2 R_r}{n}$$

where s is the Laplace operator, $R_r$ is the resistance of the motor rotor, $T_n$ is the motor NOminal torque, n is the number of poles in the motor, and $\phi_n$ is the NOminal flux of the motor.

5. Regulation system according to any one of claims 1 to 4, characterized in that the system also reacts to the derivative of the flux set value with respect to time.

6. Regulation system according to claim 2, characterized in that the said maximum threshold is the NOminal motor torque and the said minimum threshold is of the order of 4% of the NOminal torque.

\* \* \* \* \*